United States Patent
Rogers et al.

(10) Patent No.: US 7,302,675 B2
(45) Date of Patent: Nov. 27, 2007

(54) SYSTEM AND METHOD FOR ANALYZING A GRAPHICAL PROGRAM USING DEBUGGING GRAPHICAL PROGRAMS

(75) Inventors: Steven W. Rogers, Austin, TX (US); Jeffrey L. Kodosky, Austin, TX (US)

(73) Assignee: National Instruments Corporation, Austin, TX (US)

( * ) Notice: Subject to any disclaimer, the term of this patent is extended or adjusted under 35 U.S.C. 154(b) by 704 days.

(21) Appl. No.: 09/941,057

(22) Filed: Aug. 28, 2001

(65) Prior Publication Data

US 2003/0046663 A1    Mar. 6, 2003

Related U.S. Application Data

(60) Provisional application No. 60/312,259, filed on Aug. 14, 2001.

(51) Int. Cl.
*G06F 9/44* (2006.01)

(52) U.S. Cl. .................. 717/125; 717/109; 717/127; 717/131

(58) Field of Classification Search ........ 717/100–135; 345/962–964, 762–764
See application file for complete search history.

(56) References Cited

U.S. PATENT DOCUMENTS

| | | | |
|---|---|---|---|
| 4,868,785 A | 9/1989 | Jordan et al. | |
| 4,914,568 A | 4/1990 | Kodosky et al. | |
| 5,040,131 A | 8/1991 | Torres | |
| 5,136,705 A | 8/1992 | Stubbs et al. | |
| 5,377,318 A | 12/1994 | Wolber | |
| 5,481,740 A * | 1/1996 | Kodosky | 715/839 |
| 5,652,909 A | 7/1997 | Kodosky | |
| 5,915,114 A * | 6/1999 | McKee et al. | 717/128 |
| 6,042,614 A * | 3/2000 | Davidson et al. | 717/116 |
| 6,412,106 B1 * | 6/2002 | Leask et al. | 717/124 |
| 2003/0037322 A1 * | 2/2003 | Kodosky et al. | |

* cited by examiner

*Primary Examiner*—Wei Y. Zhen
*Assistant Examiner*—Chuck Kendall
(74) *Attorney, Agent, or Firm*—Meyertons Hood Kivlin Kowert & Goetzel, P.C.; Jeffrey C. Hood; Martin R. Wojcik

(57) ABSTRACT

A system and method for implementing a debugging graphical program in a main graphical program. A user can associate a debugging graphical program with a wire in a data flow diagram in order to debug and/or analyze the main graphical program. This association does not change or require recompilation of the main graphical program. The debugging graphical program, or smart probe, receives the data from the main graphical program, analyzes this data, and can perform one of several actions. The debugging graphical program can display the data in the wire, generate statistics based on received data, log statistics or data to a file, or perform other analysis functions. The debugging graphical program can also cause the main graphical program into halting execution, entering single stepping mode, etc. The user may choose a debugging graphical program already present, or create one using graphical programming techniques.

39 Claims, 9 Drawing Sheets

SYSTEM AND METHOD FOR ANALYZING A GRAPHICAL PROGRAM USING DEBUGGING GRAPHICAL PROGRAMS

PRIORITY DATA

This application claims benefit of priority of provisional application Ser. No. 60/312,259 titled "System and Method for Analyzing a Graphical Program Using Debugging Graphical Programs" filed on Aug. 14, 2001, whose inventors are Steven W. Rogers and Jeffrey L. Kodosky.

FIELD OF THE INVENTION

The present invention relates to the field of graphical programming, and more particularly to a system and method for enabling a graphical program to use and implement debugging graphical programs.

DESCRIPTION OF THE RELATED ART

Traditionally, high-level text-based programming languages have been used by programmers in writing application programs. Many different high-level programming languages exist, including Visual BASIC, C/C++, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C/C++, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C/C++, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

In computer software and hardware development, debugging is the process of locating, fixing, or bypassing "bugs" (errors) in computer program code or the engineering of a hardware device. Debugging a program or hardware device may involve identifying a problem, isolating the source of the problem, and then fixing it. A user of a program that does not know how to fix the problem may learn enough about the problem to be able to avoid it until it is permanently fixed.

Debugging is a necessary process in almost any new software or hardware development process, whether a commercial product or an enterprise or personal application program. For complex products, debugging may be performed for the smallest unit of a system, again at component test when parts are brought together, again at system test when the product is used with other existing products, and again during customer beta test, when users try the product out in a real world situation. Because most computer programs and many programmed hardware devices contain thousands of lines of code, almost any new product is likely to contain "bugs". Invariably, the bugs in the functions that get most use are found and fixed first. Debugging tools help identify coding errors at various development stages. Some programming language packages include a facility for checking the code for errors as it is being written.

Current debugging techniques for high-level text-based languages such as C/C++, Visual Basic, and Java include inserting print statements in the body of the program to monitor program execution and data values, and logging this information to a file. However, the aforementioned techniques need to be introduced by the programmer him or herself. In addition, the programmer has an option to debug interactively, i.e., by single stepping through a program or by using breakpoints, and looking at the data values in memory, as well as the pointers, or physical memory addresses for the data.

For graphical programming languages, or iconic-based programs, various debugging techniques have been used. U.S. Pat. No. 5,377,318 titled "Line Probe Diagnostic Display in an Iconic Programming System" describes a line probe feature wherein a user may select a line or wire in the iconic program, the iconic program halts execution, and the data on that wire generated during execution of the iconic program may be viewed in a dialog box. U.S. Pat. Nos. 5,481,740 and 5,652,909 describe an "autoprobe" or "execution highlighting" feature for a graphical program. This execution highlighting feature illustrates the data output of each node as data propagates through the data flow path. As each node executes or fires, a routine is invoked which displays the resultant data on the block diagram. Thus, a user can select the autoprobe feature and visually see the data flow out each node as the block diagram executes.

One graphical programming development environment, LabVIEW, has various graphical debugging features, including a probe feature, an autoprobe feature, a single stepping mode, and the ability to set breakpoints, among others.

However, current debugging techniques for graphical programs are inadequate for some applications, and there is a need for more advanced debugging techniques and methods. Prior art methods are limited in the amount of custom debugging and analysis functionality the user can create for his or her graphical program. For example, it would be desirable to analyze contents of more complex data structures such as images, create custom debugging tools, as well as perform performance analysis on graphical programs. It would further be desirable for the user to be able to create customer enhanced debugging tools using simple graphical programming techniques. It would further be desirable for the user to be able to utilize such enhanced debugging tools without requiring modification or re-compilation of the graphical program being analyzed or debugged.

SUMMARY OF THE INVENTION

One embodiment of the present invention comprises a system and method for debugging and/or analyzing a main graphical program using one or more debugging graphical programs. Thus, the debugging tool can be created using simple high level graphical programming techniques, enabling the user to more easily create a custom debugging graphical program that can better serve the user's needs. The user can also utilize or modify a debugging graphical program supplied with the graphical programming development environment.

In one embodiment, the debugging graphical program can be associated with the main graphical program by selecting a wire or flow path in the main graphical program and then choosing an option to associate the debugging graphical program at this location. The user may be able to select from a number of different possible debugging graphical programs. In one embodiment, when the user selects a flow path in the main graphical program, the method analyzes the data type of the data being generated on this wire and displays only appropriate debugging graphical programs that correspond to this data type. In response to this associating step, the memory may store one or more data structures comprising information regarding the first graphical program, the debugging graphical program, and the location or data flow path where the debugging graphical program is associated.

This association may be performed without modifying the main graphical program. Thus, a re-compilation of the main graphical program is not necessary. In other words, associating a debugging graphical program with a main graphical program does not modify or require recompilation of the main graphical program. This greatly simplifies the debugging process.

It is noted that the main graphical program and the debugging graphical program can reside on the same computer, can be distributed on different computers across a network such as Ethernet, or can be distributed between a computer and dedicated embedded hardware.

After the debugging graphical program is associated with the main graphical program, the main graphical program may be executed. The main graphical program will execute until the location of the associated debugging graphical program (the debugging location) is reached. For example, the main graphical program will execute until the data flow (or control flow, execution flow, etc.) in the main graphical program encounters the location of the associated debugging graphical program. At this point, the main graphical program may halt execution at the debugging location, and the debugging graphical program will receive the data from the main graphical program (e.g. from the respective data flow path where the debugging graphical program is associated) and execute.

The debugging graphical program may operate to analyze the data from the main graphical program and generate debugging results and/or debugging actions. The debugging results may comprise statistics or status information derived from data produced by the main graphical program, or other information. The debugging results may be shown on the computer display, logged to disk, or used to calculate execution performance of the main graphical program. The debugging results may be programmatically compared against user entered values and/or conditions, and various debugging actions may be programmatically taken. In other words, the debugging graphical program may perform a debugging action based on the debugging results. The debugging actions may include halting execution of the main graphical program, causing the main graphical program to enter single-stepping mode, or completing execution of the main graphical program. The execution performance of portions of the main graphical program can also be deduced from the difference in execution times of a plurality of different debugging graphical programs associated at different locations in the main graphical program.

When the user has completed debugging operations, the user may choose to disassociate the debugging graphical program from the main graphical program, so that the debugging graphical program no longer executes when the main graphical program executes. This disassociation also does not modify or require re-compilation of the main graphical program.

Thus, the present invention provides an improved system and method for debugging or analyzing a graphical program. The debugging graphical program can be created with simple graphical programming techniques. Further, the user can utilize a debugging graphical program without requiring modification and/or re-compilation of the graphical program being debugged or analyzed.

BRIEF DESCRIPTION OF THE DRAWINGS

A better understanding of the present invention can be obtained when the following detailed description of the preferred embodiment is considered in conjunction with the following drawings, in which.

Figure 1:
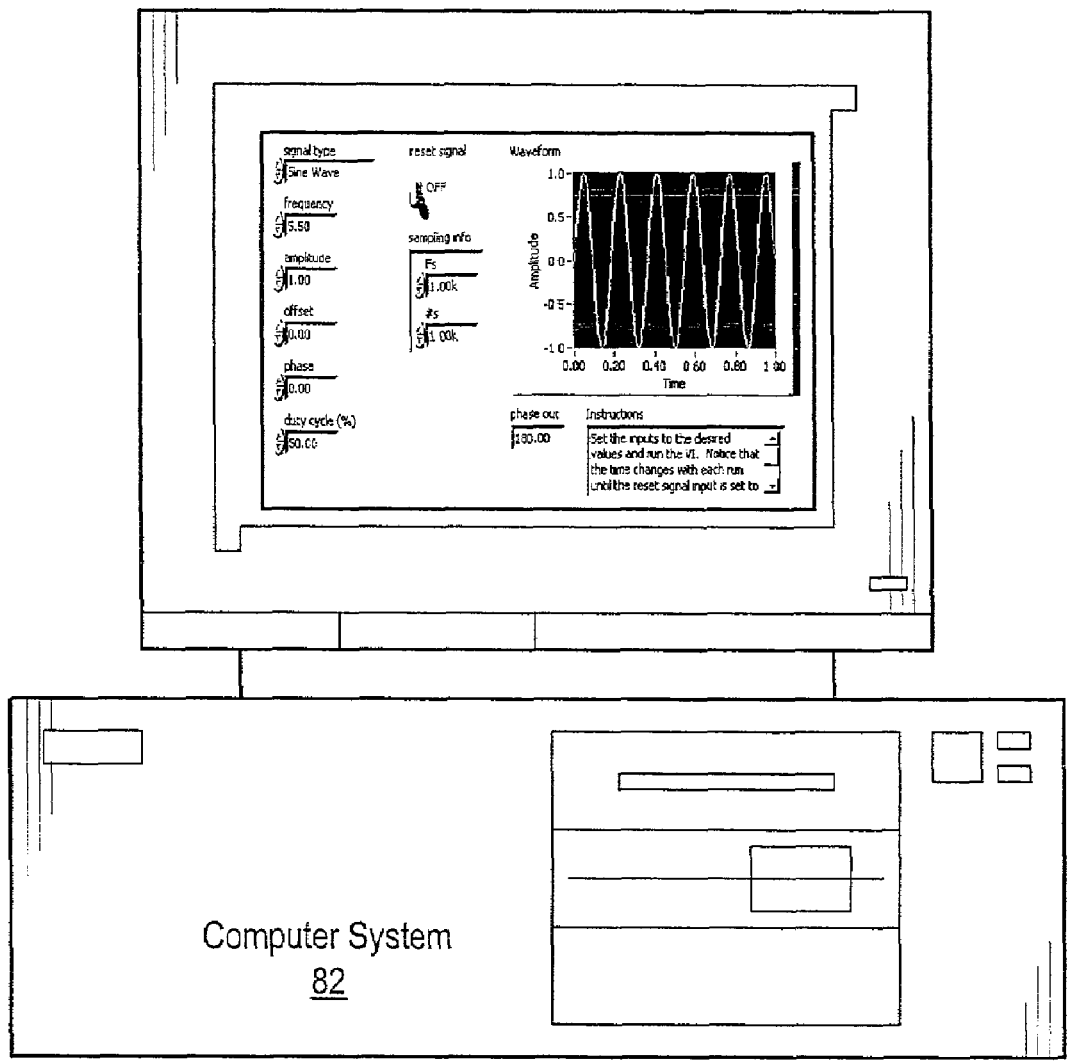
FIG. 1 illustrates a computer system 82 operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 5,652,909 titled "Method and Apparatus for Providing Autoprobe Features in a Graphical Data Flow Diagram".

The LabVIEW and BridgeVIEW graphical programming manuals, including the "G Programming Reference Manual", available from National Instruments Corporation, are also hereby incorporated by reference in their entirety.

FIG. 1—Computer System

FIG. 1 illustrates a computer system 82 operable to create and/or execute a graphical program. The computer system 82 may be configured to implement various embodiments of the present invention. One embodiment of a method for creating and/or usisng a debugging graphical program (or "smart probe") for debugging a graphical program, is described below.

As used herein, the term "bug" refers to an error in a computer software program. The error may be a result of incorrect code, instructions or data entered by the user in a program, or may simply be an undesirable operation or effect produced by the program. In a graphical program, the term "bug" may refer to incorrect nodes, incorrectly configured nodes, etc.

The term "debugging" refers to a process during which a user may utilize various tools (such as a debugging graphical program) to identify, locate and/or analyze bugs or their effects in a program.

The term "debugging graphical program" refers to a graphical program or iconic program that performs a debugging operation, i.e., a graphical program or iconic program that operates to perform one or more of identifying, locating, or analyzing bugs. The term debugging graphical program as used herein may also refer to a graphical program or iconic program that is operable to analyze at least a portion of the graphical program, such as analyzing a graphical program portion to assess performance characteristics.

The term "debugging results" refers to the results or data generated by the debugging graphical program. For example, the term "debugging results" may include the data produced by the main graphical program, statistics generated from the data produced by the main graphical program, statistics regarding the operation of the debugging graphical program, statistics regarding the operation of the main graphical program, and/or control values indicating subsequent operation of the main graphical program, among others. The above list is merely exemplary, and other types of debugging results are possible.

The computer system 82 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

As shown in FIG. 1, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform. The display device may be operable to display a main graphical program that is desired to be debugged, and a debugging graphical program.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and execute such graphical programs. The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

The software programs of the present invention may be stored in a memory medium of the respective computer 82, or in a memory medium of another computer, and executed by the CPU. The CPU executing code and data from the memory medium thus comprises a means for implementing the steps described below.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input data and/or output data that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output data, only input data, or both input and output data. Further, in some embodiments the user interface or front panel of a graphical program may enable the user to interactively control or manipulate the input data being provided to the graphical program.

Examples of graphical program development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. In the preferred embodiment, the system uses the LabVIEW graphical programming system available from National Instruments.

Figure 2:
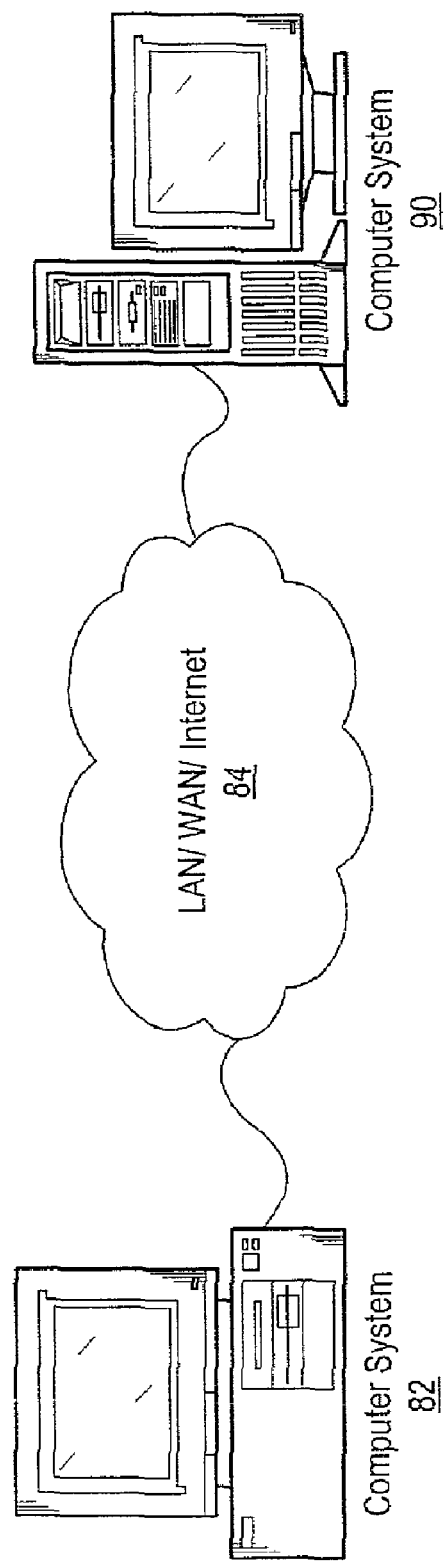
FIG. 2 illustrates a network system comprising two or more computer systems that may implement an embodiment of the present invention.

FIG. 2—Computer Network

FIG. 2 illustrates a system including a first computer system 82 that executes a first or main graphical program that is desired to be debugged, and a second computer system 90 that may store and/or execute a debugging graphical program. The computer system 82 may be connected through a network 84 (or a computer bus) to the second computer system 90. The computer systems 82 and 90 may each be any of various types, as desired. Also, the network 84 can also be any of various types, including a LAN (local area network), WAN (wide area network), the Internet, or an Intranet, among others.

Program output or debugging results of the debugging graphical program executing on the computer system 90 may be displayed in the graphical user interface on a display device of the computer system 82. Also, in response to receiving user input to the graphical user interface, the user input may be provided to the block diagram. The above-incorporated patent application titled "Graphical Programming System with Distributed Block Diagram Execution and Front Panel Display" describes one embodiment of a method enabling graphical program execution and GUI display of the graphical program output to be distributed across multiple computer systems.

In another embodiment, the main graphical program may execute on a reconfigurable instrument 190 (FIG. 3), and the debugging graphical program may execute and/or display results on the host computer system 82. The reconfigurable instrument 190 may include a functional unit or configurable logic, such as a programmable logic device (PLD), e.g., an FPGA, or a processor and memory, which may execute a real time operating system. For example, an application development environment associated with the main graphical program may provide support for debugging a main graphical program, wherein the main graphical program executes on configurable logic in a real time system, such as the reconfigurable instrument 190, and the application development environment and debugging graphical program execute on the host computer system 82.

Figure 2A:
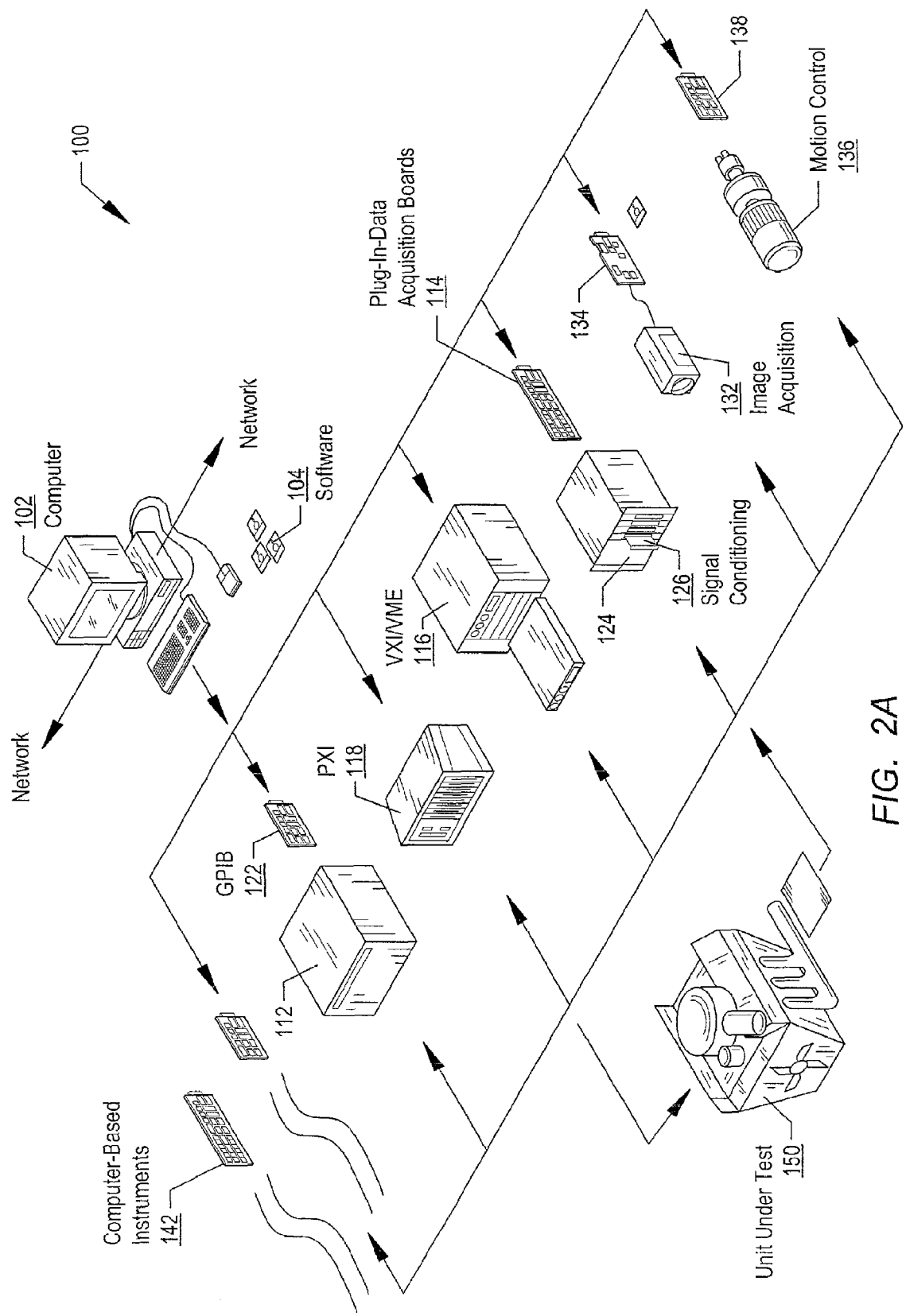
FIG. 2A illustrates an instrumentation control system according to one embodiment of the invention.
Figure 2B:
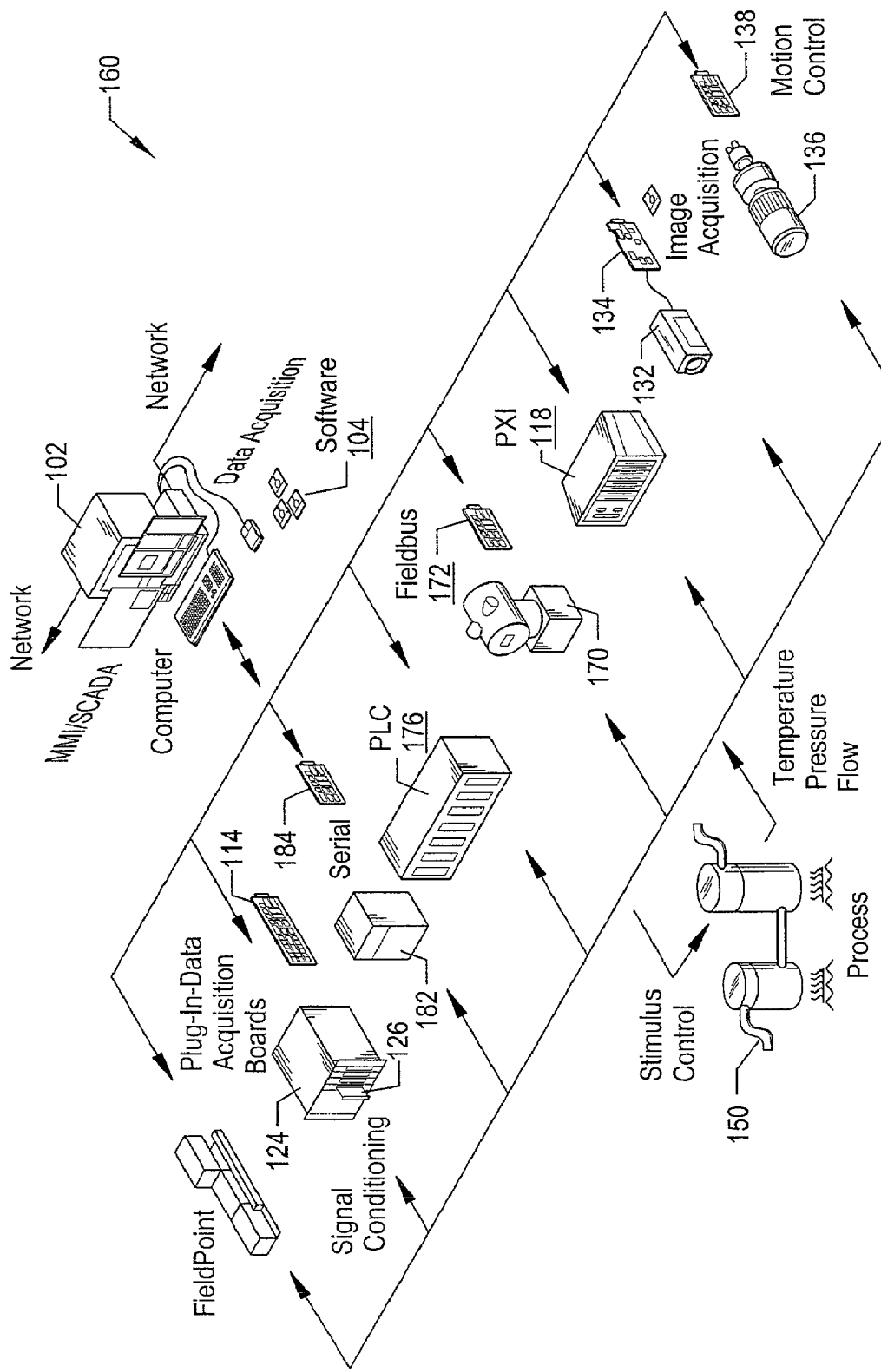
FIG. 2B illustrates an industrial automation system according to one embodiment of the invention.

FIGS. 2A and 2B—Instrumentation and Industrial Automation Systems

The following describes embodiments of the present invention involved with analyzing or debugging graphical programs that perform test and/or measurement functions and/or control and/or model instrumentation or industrial automation hardware. However, it is noted that embodiments of the present invention can be used for a plethora of applications and are not limited to instrumentation or industrial automation applications. In other words, the following description is exemplary only, and the present invention may be used in any of various types of systems. Thus, the system and method of the present invention is operable to be used in any of various types of applications for any of various types of graphical programs.

FIG. 2A illustrates an exemplary instrumentation control system 100 which may implement embodiments of the present invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The GPIB instrument 112 may be coupled to the computer 82 via the GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, the computer based instrument card 142, and the DAQ card 114 are typically plugged in to an I/O slot in the computer 82, such as a PCI bus slot, a PCMCIA card slot, a PC Card slot, or an ISA, EISA or MicroChannel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a GPIB interface card 122, VXI, MXI, or an IEEE 1394 interface card (not shown), which interfaces to the VXI chassis 116. The PXI chassis or instrument may be coupled to the computer 82 through the computer's PCI bus or Ethernet network interface.

A serial instrument 182 may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (an Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system 144 such as the Fieldpoint system available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS-232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a computer system as shown in FIGS. 2A and 2B, traditional "stand-alone" instruments, as well as other types of measurement and control devices. The term "measurement function" may include any type of data acquisition, measurement or control function, such as that implemented by the instruments shown in FIGS. 2A and 2B. For example, the term "measurement function" includes acquisition and/or processing of an image. As described below, a graphical program may be created that implements a measurement function. For example, the graphical program may be used to acquire a signal and perform the measurement function on the acquired signal.

In the embodiments of FIGS. 2A and 2B above, one or more of the various instruments may couple to the computer 82 over a network, such as the Internet. In one embodiment, the user operates to select a target instrument or device from a plurality of possible target devices for programming or configuration according to the present invention. Thus the user may create a graphical program on a computer and use the graphical program in conjunction with a target device or instrument that is remotely located from the computer and coupled to the computer through a network.

Graphical software programs which perform data acquisition, analysis and/or presentation, e.g., for measurement, instrumentation control, industrial automation, or simulation, such as in the applications shown in FIGS. 2A and 2B, may be referred to as virtual instruments.

Although in the preferred embodiment the graphical programs and programmable hardware are involved with measurement applications, including data acquisition/generation, analysis, and/or display, and for controlling or modeling instrumentation or industrial automation hardware, as noted above the debugging features of the present invention can be used for a plethora of applications and are not limited to measurement, instrumentation or industrial automation applications. In other words, FIGS. 2A and 2B are exemplary only, and the present invention may be used in any of various types of systems. Thus, the system and method is operable for creating and/or executing debugging graphical programs or graphical code for any of various types of applications, including general purpose software applications such as word processing, spreadsheets, network control, games, etc.

Figure 3:
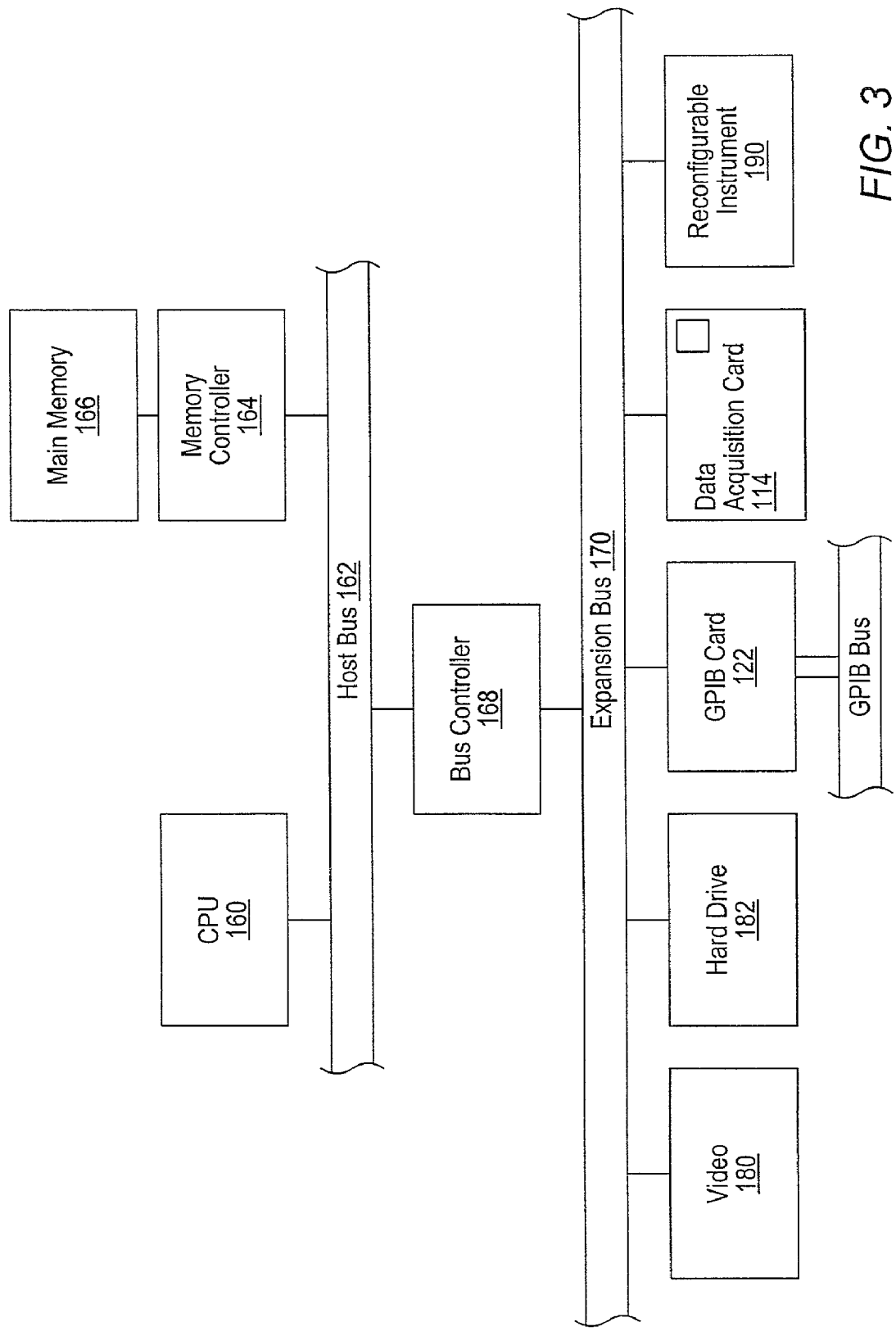
FIG. 3 is an exemplary block diagram of the computer systems of FIGS. 1, 1A, 2A and 2B.

FIG. 3—Computer System Block Diagram FIG. 3 is a block diagram representing one embodiment of the computer system 82 and/or 90 illustrated in FIGS. 1 and 1A, or computer system 82 shown in FIG. 2A or 2B. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store the graphical program operable to receive and respond to programmatic events. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170. A reconfigurable instrument 190 may also be connected to the computer.

Figure 4:
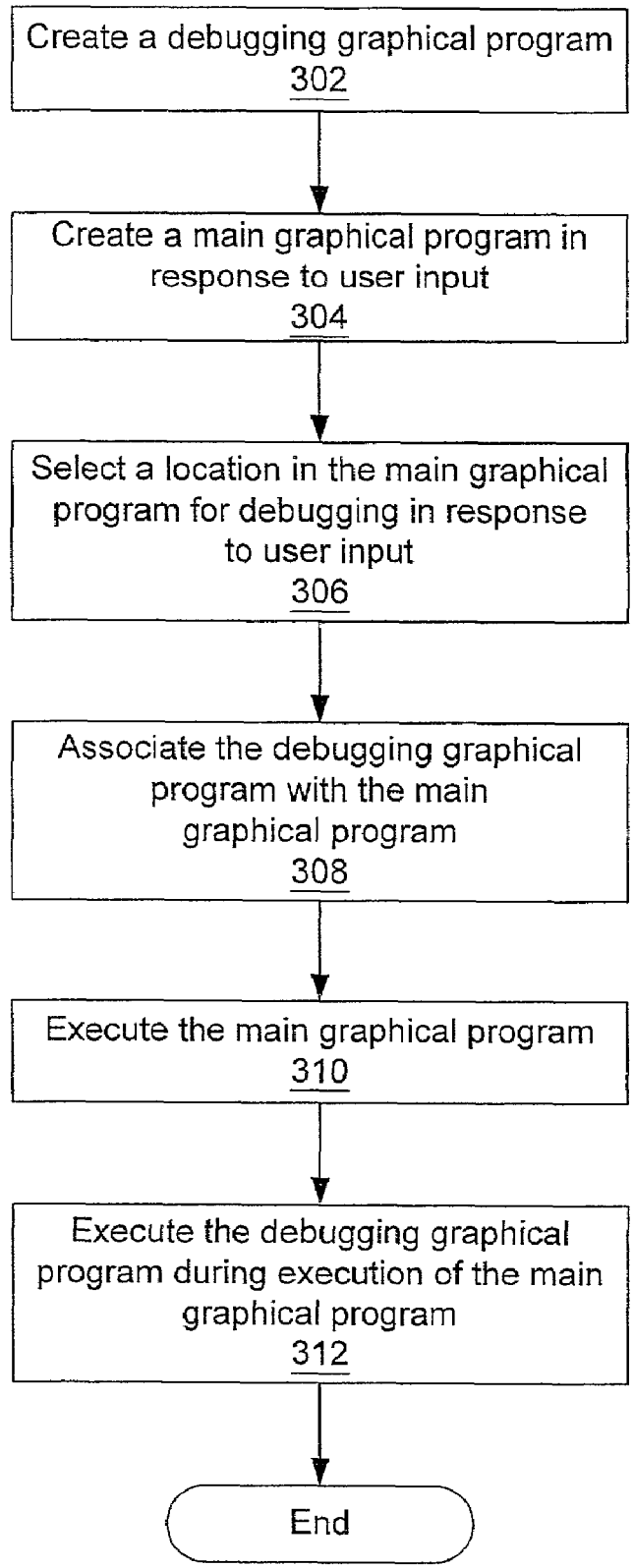
FIG. 4 is a flowchart diagram illustrating one embodiment of a method for creating and executing a main graphical program operable to use a debugging graphical program.

FIG. 4—Flowchart of the Method for Smart Probe Configuration

FIG. 4 illustrates a method for configuring a graphical program to use a debugging graphical program, also called a smart probe. In the exemplary embodiment shown, FIG. 4 illustrates a method for creating and using a debugging graphical program in a graphical program that is desired to be analyzed or debugged, also referred to as the "main graphical program" or the "first graphical program". As shown, in one embodiment, this method may operate as follows.

First, in step 302, a debugging graphical program may be created on the computer system 82 (or on a different computer system). The debugging graphical program may be created or assembled by the user or a developer arranging on a display a plurality of nodes or icons and then interconnecting the nodes to create the debugging graphical program. In response to the user assembling the debugging graphical program, data structures may be created and stored which represent the debugging graphical program. The nodes may be interconnected in one or more of a data flow, control flow, or execution flow format. The debugging graphical program may thus comprise a plurality of interconnected nodes or icons, which visually indicates the functionality of the program. As noted above, the debugging graphical program may comprise a block diagram and may also include a user interface portion or front panel portion. Where the debugging graphical program includes a user interface portion, the user may assemble the user interface on the display. As one example, the user may use the LabVIEW graphical programming development environment to create the debugging graphical program.

It should be noted that in step 302, the user can optionally create the debugging graphical program, optionally modify an existing debugging graphical program, or a previously created debugging graphical program may be used without any modification.

The user may also create the debugging graphical program using a wizard and programmatic generation techniques as described in U.S. patent application Ser. No. 09/745,023 titled "System and Method for Programmatically Generating a Graphical Program in Response to Program Information," filed Dec. 20, 2000, which is hereby incorporated by reference as though fully and completely set forth herein.

In step 304, the user may create a main graphical program. The main graphical program is preferably created in a similar manner to the debugging graphical program. For example, the user may create the main graphical program by arranging on a display a plurality of nodes or icons and then interconnecting the nodes to create the main graphical program. In response to the user assembling the main graphical program, data structures may be created and stored which represent the main graphical program. The nodes may be interconnected in one or more of a data flow, control flow, or execution flow format. The main graphical program may thus comprise a plurality of interconnected nodes or icons, which visually indicate the functionality of the program. The main graphical program may comprise a block diagram and may also include a user interface or front panel. The main graphical program may have errors or bugs that the user desires to identify, locate, analyze, and/or remove. These errors may have been introduced by the user by mistake and/or omission.

In step 306, the user selects a location, called the "debugging location" in the main graphical program where the debugging graphical program is desired to be located. This selection may be performed on the basis of where the user desires to debug the main graphical program, or evaluate the inputs and outputs of the graphical nodes to make sure the main graphical program is executing properly. The selection may also be based on where the user desires to analyze a respective portion of the main graphical program, such as for purposes of optimizing a portion of the main graphical program or for analyzing performance of a portion of the main graphical program.

In step 308, the user associates the debugging graphical program with the main graphical program at the debugging location. The association specifies that the debugging graphical program is operable to execute at the respective debugging location, such as the selected data flow path, control flow path, or execution flow path. The association of the debugging graphical program with the main graphical program is performed without any actual modification or re-compilation of the main graphical program. In other words, the association of the debugging graphical program with the main graphical program does not modify the main graphical program.

In one embodiment of the invention, each data flow path or wire in the diagram includes a flag which indicates whether a debugging graphical program is associated along that respective path. For example, the flag for a first path or wire may have a "1" value to indicate a debugging graphical program is associated with the first path and may have a "0" value to indicate a debugging graphical program is not associated with the first path. The graphical program also includes code ("checking code") that is operable to check the value of the flag for each flow path as that flow path executes in the block diagram. For example, where the graphical program includes a data flow block diagram, this code may check the value of the flag for each data flow path as data is generated on that data flow path during execution of the graphical program. In this embodiment, the association of the debugging graphical program with the main graphical program at a first flow path or first wire comprises setting the respective flag accordingly (e.g., to a "1"). This operation is akin to changing the value of a variable, and is not considered to be a modification of the main graphical program. This operation also of course does not require re-compilation. When the user disassociates the debugging graphical program from the main graphical program, the respective flag is cleared.

When the user selects a flow path and a debugging graphical program and creates an association as described above, a data structure may also be modified in memory. This data structure may comprise identification of the main graphical program, identification of the debugging graphical program, and identification of the respective data flow path. As discussed below, the checking code is operable to index into this data structure based on the respective flow path being executed and invoke the selected debugging graphical program.

In one embodiment of step 308, the association of the debugging graphical program can be performed using a graphical method. This graphical method may comprise the user using a pointing device (e.g., mouse) to move a cursor, pointer or other icon on the display over a flow path or wire in the main graphical program that the user would like to analyze or debug. Once the mouse pointer (or cursor) or icon is over the aforementioned data wire on the display, the user may select, e.g., by clicking a right mouse button, a set of options available to the user. These options may comprise inserting or associating a debugging graphical program at that location. The user may also further view a set of debugging graphical programs available to the user, such as for that particular data wire. In one embodiment, the user may "browse" for available debugging graphical programs. Once the user selects the debugging graphical program best suited for his or her debugging and/or analyzing functionality, the association of a debugging graphical program with this flow path location of the main graphical program is complete from the user's perspective.

In one embodiment, in step 308 the user can select the debugging graphical program created in step 302, or any other debugging graphical program, either previously existing, or created by the user. In another embodiment, when the user selects a wire or flow path (e.g., right click on a wire), the method (e.g., the graphical program development environment) analyzes the data type (or other type) of the wire and determines a subset of debugging graphical programs that are suitable for this data type (or other type). In one data flow embodiment, each data flow path or wire may generate or have an associated type descriptor which indicates a data type of the data being propagated on the wire. The graphical program development environment may analyze this data type and determine and display only the appropriate debugging graphical programs that are suitable for this data type. This helps prevent the user from associating an unsuitable debugging graphical program. In another embodiment, the user may associate a polymorphic debugging graphical program that is polymorphic with respect to data type. A polymorphic debugging graphical program is capable of receiving data of any type (or a subset of types) and may perform different operations for different data types.

In step 310, the user executes the main graphical program on the computer system 82 (or on a different computer system). The main graphical program executes up to the debugging location where the debugging graphical program has been associated.

In step 312, after the main graphical program executes up to the debugging location the debugging graphical program executes on the computer system 82 (or on a different computer system). As described above, upon reaching the debugging location, the checking code will determine that the flag is set, indicating a debugging graphical program is associated at this flow path location. The checking code may then index into a data structure based on the flow path to determine the debugging graphical program to invoke. The details of step 314 are explained with reference to FIG. 5. After the debugging graphical program executes, the main graphical program can resume execution from or after the debugging location and may finish execution.

Figure 5:
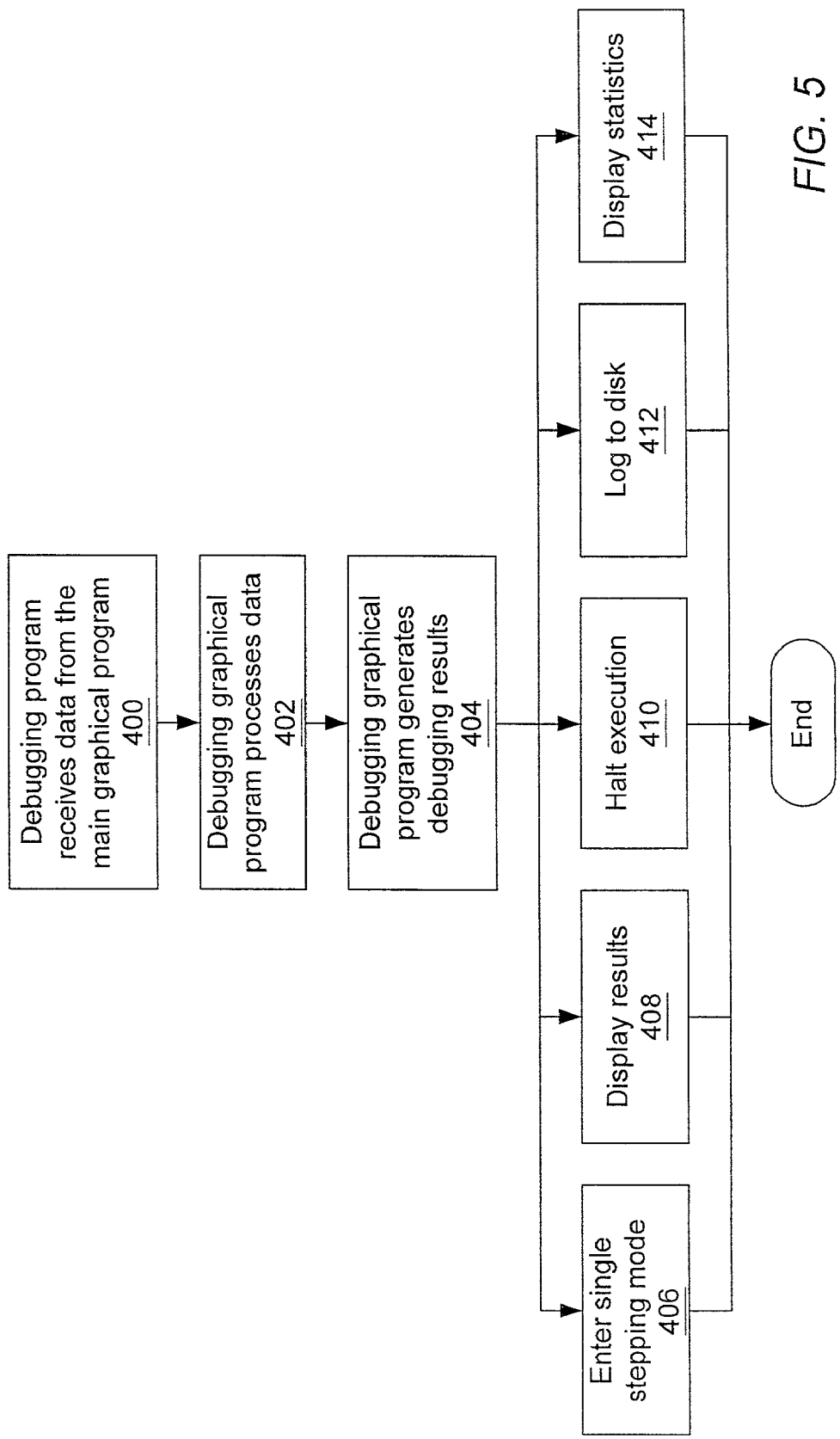
FIG. 5 is a flowchart diagram illustrating one embodiment of the execution of the debugging graphical program.

FIG. 5 Flowchart of the Execution of the Debugging Graphical Program

FIG. 5 is a flowchart diagram illustrating one embodiment for the process of executing the debugging graphical program. In step 400, the debugging graphical program receives the data from the main graphical program. As noted above, the debugging graphical program is associated with a debugging location, typically a data flow path of the main graphical program. Thus, the debugging graphical program will receive data generated on this data flow path. This data may comprise a form of intermediate data generated during execution of the main graphical program. The data can be of any kind or type, such as numeric values, strings, arrays, clusters, tables, path names, pointers, images acquired for the image acquisition card 134 and associated video device or camera 132, data from any other or a combination of the instruments described in FIGS. 2A and 2B, or any other device connected to computer 82 previously described, connected to the device or process 150. The data may comprise configuration parameters, which are used to set up the aforementioned devices, an intermediate result of the analysis from the main graphical program, and many other types of data. The data may also comprise of one of the final results of the main graphical program.

In step 402, the debugging graphical program processes the data acquired in step 400. Examples of this processing may include determining if the data is actually acquired and/or generated, if any pointers and references actually point to a valid memory reference, etc. For example, in this step the data may be examined for its structural validity. For example, a reference to a image data structure may be checked to ensure that the actual image data structure exists at the specific location. In step 402 the graphical code of the debugging graphical program executes to perform the debugging or analysis operation that it was designed to perform. The debugging graphical program may perform any of various types of debugging or analysis operations, as known to those skilled in the art.

During, after and/or in response to the execution of step 402, the debugging graphical program generates debugging results in step 404. The debugging results may depend on the type of data received by the debugging graphical program, as well as the functionality, i.e., the graphical code, that has been programmed by the user or by the creators of this debugging graphical program.

In step 404, the debugging results may also determine the next execution step for the main graphical program, which depends on the prior user configuration. The next step may comprise any one or more of various options as shown in steps 406-414 such as entering single stepping mode, displaying results, such as data received, statistics, or other information, halting execution, or logging to disk, among others. The user may also be interactively queried after execution of the debugging graphical program as to the next action. Any one or more of these options may be used, depending on the creator and/or operator of the debugging graphical program. The action taken may depend on the debugging graphical program configuration and/or the value of the debugging data being examined, or based on user input. As one example, the debugging or graphical program may produce a Boolean value as a debugging result that directs the main graphical program to either enter single stepping mode or continue execution. As another example, the action taken may be independent of the main graphical program data. For example, the debugging graphical program may be configured to cause the main graphical program to automatically enter single stepping mode, regardless of the debugging results. Other actions may be programmed by the user into the debugging graphical program in step 302. As noted above, the debugging graphical program may also be programmed to query the user for an appropriate action, possibly after the user views the debugging results.

In step 406, the main graphical program may enter a single stepping mode, possibly based on the debugging results of the debugging graphical program. This step is similar to previous U.S. Pat. No. 5,652,909. In one embodiment, the single stepping mode is not executed unless the value of the debugging results is a certain value or a range of values, and the user has configured the graphical node to enter the single stepping node upon such data range. In the single stepping mode the main graphical program can be debugged for erroneous data or calculations. The main graphical program can then be switched back to normal execution if desired by the user.

In step 408, the debugging graphical program may display the debugging results of either the data being analyzed, or of an analysis, as created in step 302, performed by the debugging graphical program. These results may comprise data or data structures received from the main graphical program as described in step 400, and/or debugging results generated in step 404. In addition, the results may comprise additional functionality such as the difference in time between two or more debugging graphical program associated in the main graphical program in order to calculate timing specifications of the main graphical program.

In step 410, the main graphical program may halt execution, possibly based on the debugging results. This feature may be activated by a configuration of a result, such as a Boolean indicator, located in the debugging graphical program. The user may configure the halt execution feature in the debugging graphical program in an event that the data from step 400 may cause the device or process 150 to operate in an erroneous or even dangerous mode. The main graphical program can then be switched back to normal execution if desired by the user.

In step 412, the debugging graphical program may log the debugging data generated in step 404, possibly based on the debugging results of the debugging graphical program. This may include analysis done on the data received from the main graphical program in step 400, or the exact data received in step 400 without modifications. In addition, any of the displayed data from step 408, as well as any other data that the user chooses to be important, can be logged to a file. The file can be located anywhere on the local computer 82, saved to the memory medium 104, as well as anywhere on the network. The logged debugging data can be retrieved at a later time for detailed analysis of the execution of the main graphical program.

In step 414, the debugging graphical program may display statistics, again possibly based on the debugging results of the debugging graphical program. As described in step 412, the statistics may comprise the actual debugging data itself 400, results of the debugging data analysis 404, or values of the logged data 412. Statistics are especially important for multiple executions of the main graphical program, for evaluating performance improvements of the main graphical program, as well as for detailed timing analysis of certain events taking place in the main graphical program.

FIGS. 6-10—Debugging Graphical Program Example

FIGS. 6-10 display various phases of the execution of a debugging graphical program. The debugging graphical programs, also referred to as smart probes, are configured within the main graphical program using the methods described in FIG. 6. The execution of the debugging graphical program is described in FIG. 7. FIGS. 6-10 illustrate one of the possible embodiments of the methods described above.

Figure 6:
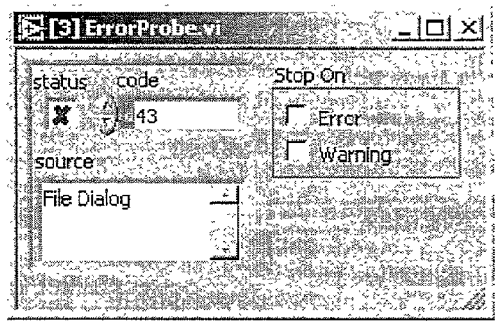
FIG. 6 illustrates one embodiment of a front panel of a debugging graphical program.

FIG. 6 shows an exemplary front panel of a debugging graphical program. This particular embodiment of the debugging graphical program can be associated with the main graphical program or wire of type "error", and display the data flowing on an error wire. In the embodiment shown, the smart probe is displaying the last value on the error wire as connected in the main graphical program.

Figure 7:
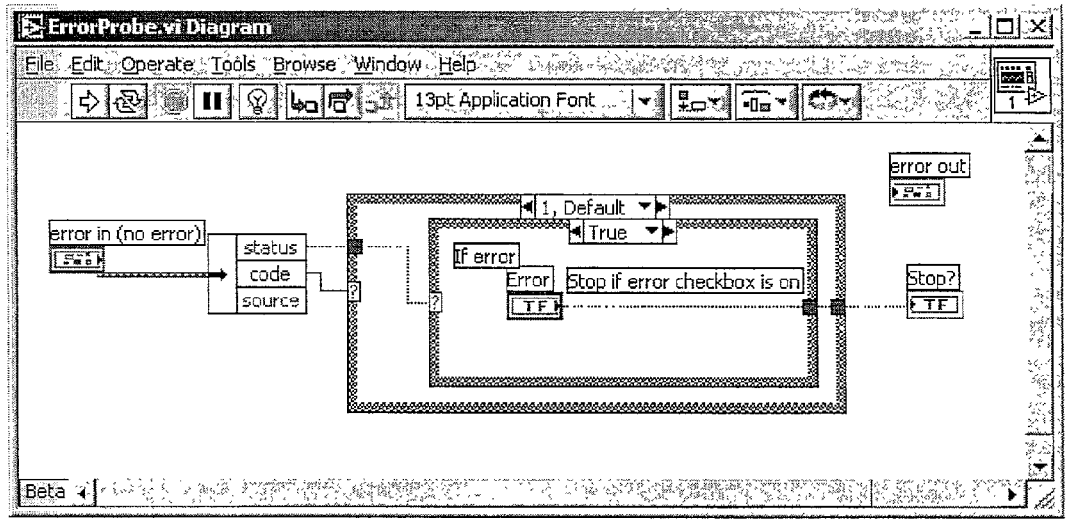
FIG. 7 illustrates one embodiment of a block diagram of the debugging graphical program.

FIG. 7 shows an exemplary diagram of a debugging graphical program, corresponding to the front panel of FIG. 6. This debugging graphical program may be included with the standard LabVIEW graphical program. The user may choose to modify the included debugging graphical program if necessary for custom debugging features. In addition, the user can create his/her debugging graphical program (Step 302). In this embodiment of the debugging graphical program, the diagram is comprised of two loops, e.g., two case selector control loops from LabVIEW. The code extracts two of the elements of data from the input cluster, which contains the data received from the main graphical program (Step 400). The code field, which is the first data field, is used to make the first decision, as indicated by Step 402. The inner structure examines the status field (Step 402). If the status field is TRUE, indicating error, the debugging graphical program uses the value of the error check box in FIG. 6 or 8 to determine if the execution should be stopped (Step 410). The debugging graphical program can generate other results depending on the user input to the front panel, or prior user configuration of the debugging graphical program in Step 302.

Figure 8:
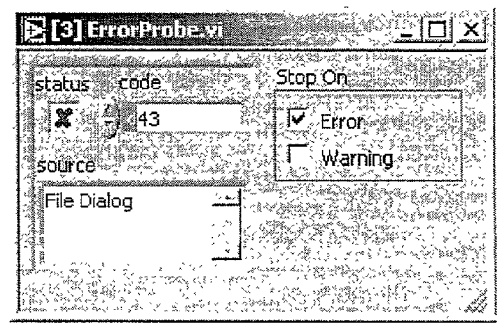
FIG. 8 illustrates another embodiment of a front panel of the debugging graphical program with an option "Stop On Error" checked.

FIG. 8 shows another embodiment of the front panel of the debugging graphical program, where the halt execution (Step 410) option has been checked by the user. In this embodiment, the execution of the main graphical program is stopped upon an encounter of an error by the debugging graphical program. Note that the debugging graphical program may be programmed to perform other operations as shown in Steps 406, 408, 410, 412, and 414. In other words, the user can create custom embodiments of the debugging graphical program as shown in Step 302.

Figure 9:
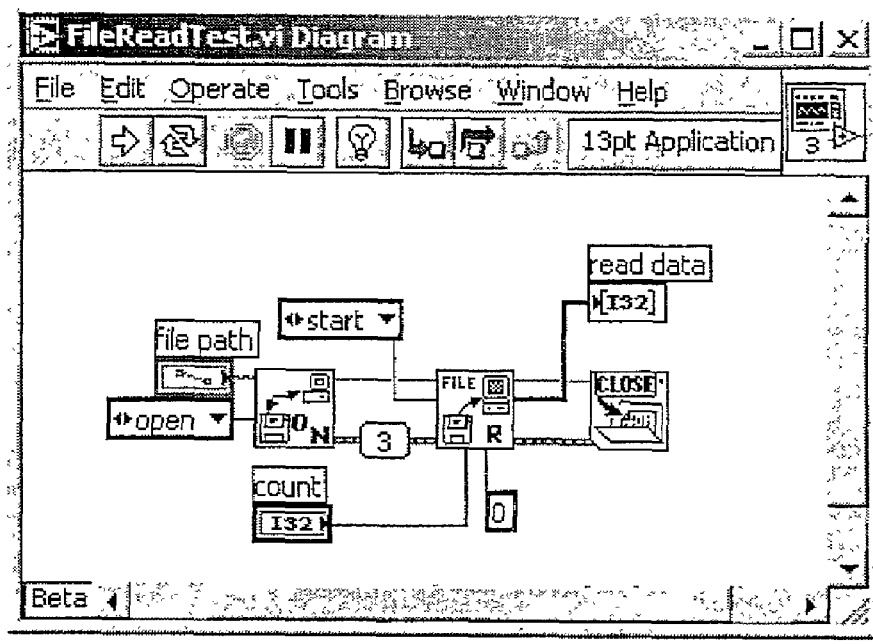
FIG. 9 illustrates one embodiment of a main graphical program having an association with the debugging graphical program.

FIG. 9 shows the association of the debugging graphical program with the main graphical program (Step 308). In this embodiment, the block diagram or graphical representation of the main graphical program (Step 304) is called "FileReadTest.vi". In this embodiment, the main graphical program includes several nodes or icons in the graphical program, connected by wires to represent data flow. The debugging graphical program is represented by a small icon containing a "3". The physical location of the debugging graphical program indicates where the association is applied to the main graphical program. During the execution of the main graphical program, described in step 310, the main graphical program executes up to the icon representing the association with the debugging graphical program. The debugging graphical program receives data (Step 400) from the main graphical program via the wire output from the "New File" icon to the "Read File" icon in FIG. 9. The debugging graphical program then processes the data received from the main graphical program (Step 402), and generates debugging results (Step 404). One example of the debugging results is shown in FIGS. 6 and 8. The contents of this embodiment of this debugging graphical program indicate an error 43 originating from the File Dialog.

Figure 10:
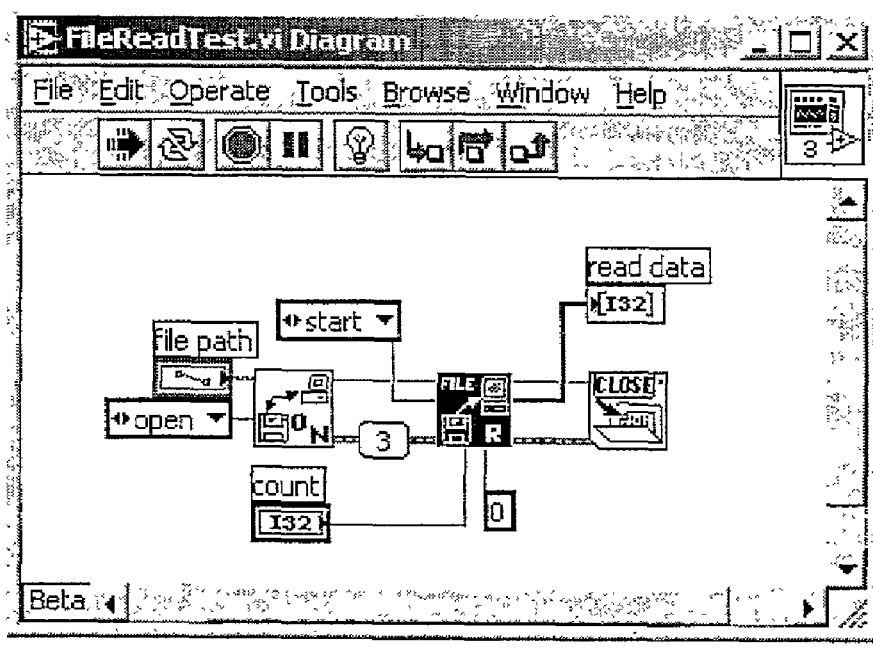
FIG. 10 illustrates one embodiment of the main graphical program executing in a single step mode.

FIG. 10 shows another embodiment of a main graphical program that is executing in a single step mode, as described in Step 406. An indication of the single step mode is the Pause button in the toolbar, and the "Read from File" icon is flashing. In the single stepping mode the user has the option of single stepping through the main graphical program until the user is satisfied with the examination.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for creating a graphical program, the method comprising:

creating a first graphical program using a graphical programming development environment, wherein said creating comprises interconnecting at least two of a first plurality of graphical program nodes or icons, wherein the first graphical program comprises the first plurality of interconnected graphical program nodes or icons which graphically represents functionality of the first graphical program, and wherein the first graphical program is executable by a computer system to perform the functionality;

storing the first graphical program in a memory; and associating a debugging graphical program at a debugging location in the first graphical program, wherein said associating does not modify the functionality of the first graphical program, wherein the debugging graphical program comprises a second plurality of interconnected graphical program nodes or icons that graphically represents functionality of the debugging graphical program wherein the debugging graphical program was created using the graphical programming development environment;

wherein the debugging graphical program is executable during execution of the first graphical program to aid in debugging at least a portion of the first graphical program.

2. The computer-implemented method of claim 1, wherein said associating does not require a re-compilation of the first graphical program.

3. The computer-implemented method of claim 1, further comprising:

executing the first graphical program up to the debugging location;

executing the debugging graphical program after executing the first graphical program up to the debugging location; and the debugging graphical program generating debugging results, wherein the debugging results are useful in analyzing at least a portion of the first graphical program.

4. The computer-implemented method of claim 3, further comprising:

completing execution of the first graphical program based on the debugging results of said executing the debugging graphical program.

5. The computer-implemented method of claim 3, wherein said executing the debugging graphical program includes displaying the debugging results of the debugging graphical program.

6. The computer-implemented method of claim 3, wherein said executing the debugging graphical program comprises:

receiving data from the first graphical program; and performing one or more of:

displaying the data from the first graphical program; and/or logging the data from the first graphical program to a file.

7. The computer-implemented method of claim 3, wherein said executing the debugging graphical program comprises:

receiving data from the first graphical program;

generating statistics based on the received data; and displaying the statistics.

8. The computer-implemented method of claim 7, wherein said statistics comprise one or more of:

data generated by the debugging graphical program;

data generated by a plurality of executions of the debugging graphical program during a corresponding plurality of executions of the first graphical program, wherein said data generated by the plurality of executions of the debugging graphical program includes differences in execution times between the plurality of executions of the debugging graphical program, wherein said differences in execution times are useable in optimizing performance the first graphical program.

9. The computer-implemented method of claim 3, wherein said completing execution of the first graphical program is performed in a single stepping mode based on the debugging results of said executing the debugging graphical program.

10. The computer-implemented method of claim 1, further comprising:

executing the first graphical program up to the debugging location, wherein the first graphical program generates data at the debugging location;

providing the data to the debugging graphical program;

executing the debugging graphical program, wherein the debugging graphical program uses the data;

the debugging graphical program generating debugging results;

based on the debugging results, performing one or more of: halting execution of the first graphical program; entering single stepping mode in the first graphical program; and/or completing execution of the first graphical program.

11. The computer-implemented method of claim 10, wherein the first graphical program executes up to the debugging location where the debugging graphical program is associated, and waits for user input.

12. The computer-implemented method of claim 1, wherein the first graphical program comprises a plurality of data flow paths;

wherein said associating the debugging graphical program at the location in the first graphical program comprises associating the debugging graphical program at a first data flow path in the first graphical program.

13. The computer-implemented method of claim 12, wherein said associating comprises:

storing information in at least one data structure, wherein the information comprises information regarding the first graphical program, the debugging graphical program, and the location where the debugging graphical program is attached along the first data flow path of the first graphical program.

14. The computer-implemented method of claim 12, wherein said associating comprises:

receiving user input from a pointing device selecting the first data flow path in the first graphical program, wherein the first data flow path is configured to carry data of a first data type;

displaying a plurality of debugging graphical programs, wherein each of the plurality of debugging graphical programs is compatible with the first data type, and wherein the plurality debugging graphical programs comprises the debugging graphical program; and receiving user input selecting the debugging graphical program from the plurality of debugging graphical programs.

15. The computer-implemented method of claim 12, wherein said associating comprises:
  receiving user input selecting the first data flow path in the first graphical program, wherein the first data flow path is configured to carry data of a first data type;
  determining the first data type of the first data flow path;
  displaying a plurality of debugging graphical programs appropriate for the first data type of the first data flow path; and
  receiving user input selecting the debugging graphical program from the plurality of debugging graphical programs appropriate for the first data type of the first data flow path.

16. The computer-implemented method of claim 1, wherein said associating the debugging graphical program at the debugging location in the first graphical program comprises associating the debugging graphical program at a node or icon in the first graphical program.

17. The computer-implemented method of claim 1, further comprising:
  disassociating the debugging graphical program from the first graphical program, wherein said disassociating does not modify the first graphical program and/or does not require a re-compilation of the first graphical program.

18. The computer-implemented method of claim 1,
  wherein the first graphical program is located on a first computer system;
  wherein the debugging graphical program is located on a second computer system, wherein the second computer system is coupled to the first computer system over a network.

19. The computer-implemented method of claim 18, the method further comprising:
  executing the first graphical program on the first computer system up to the debugging location;
  executing the debugging graphical program on the second computer system, wherein the debugging graphical program is executed after executing the first graphical program on the first computer system up to the debugging location;
  the debugging graphical program generating debugging results on the second computer system; and
  providing the debugging results from the second computer system to the first computer system.

20. The computer-implemented method of claim 1,
  wherein the first graphical program is located on a first computer system, wherein the first computer system is a target computer system coupled to or comprised in a second computer system;
  wherein the debugging graphical program is located on and executed on the first computer system.

21. The computer-implemented method of claim 1,
  wherein the first graphical program is located on a first computer system, wherein the first computer system is a target computer system coupled to or comprised in a second computer system;
  wherein the debugging graphical program is located on and executed on the second computer system.

22. A computer-implemented method for executing a first graphical program, the method comprising:
  executing the first graphical program up to a debugging location, wherein the first graphical program comprises a first plurality of interconnected graphical program nodes or icons that graphically represents functionality of the first graphical program, and wherein the first graphical program is executable by a computer system to perform the functionality, wherein the first graphical program generates data at the debugging location, wherein the first graphical program was created using a graphical programming development environment;
  providing the data to a debugging graphical program, wherein the debugging graphical program comprises a second plurality of interconnected graphical program nodes or icons that graphically represents functionality of the debugging graphical program, wherein the debugging graphical program was created using the graphical programming development environment;
  executing the debugging graphical program, wherein the debugging graphical program uses the data;
  the debugging graphical program generating debugging results;
  wherein use of the debugging graphical program does not require modification or re-compilation of the first graphical program.

23. The computer-implemented method of claim 22,
  after the debugging graphical program generates debugging results, performing one or more of: halting execution of the first graphical program; entering a single stepping mode in the first graphical program; and/or completing execution of the first graphical program.

24. The computer-implemented method of claim 22, further comprising:
  associating the debugging graphical program at the debugging location in the first graphical program;
  wherein said associating does not require modification or recompilation of the first graphical program.

25. The computer-implemented method of claim 22,
  wherein the first graphical program is located on a first computer system;
  wherein the debugging graphical program is located on a second computer system, wherein the second computer system is coupled to the first computer system over a network;
  wherein the first graphical program executes on the first computer system up to the debugging location;
  wherein the debugging graphical program executes on the second computer system, wherein the debugging graphical program is executed after executing the first graphical program on the first computer system up to the debugging location; and
  wherein the debugging graphical program generates debugging results on the second computer system.

26. A computer-implemented method for analyzing a first graphical program, the method comprising:
  storing the first graphical program in a memory of a computer system, wherein the first graphical program comprises a first plurality of interconnected graphical program nodes or icons that graphically represents functionality of the first graphical program, and wherein the first graphical program is executable by the computer system to perform the functionality, wherein the first graphical program was created using a graphical programming development environment;
  associating a second graphical program at a location in the first graphical program, wherein said associating does not modify the functionality of the first graphical program, wherein the second graphical program comprises a second plurality of interconnected graphical program nodes or icons that graphically represents functionality of the second graphical program, wherein the second graphical program was created using the graphical programming development environment;

wherein the second graphical program is executable during execution of the first graphical program to aid in analyzing at least a portion of the first graphical program.

27. The computer-implemented method of claim 26, wherein said associating does not require a re-compilation of the first graphical program.

28. The computer-implemented method of claim 26, further comprising:
executing the first graphical program up to the location;
executing the second graphical program after executing the first graphical program up to the location; and
the second graphical program generating results, wherein the results are useful in analyzing at least a portion of the first graphical program.

29. The computer-implemented method of claim 26, further comprising:
executing the first graphical program up to the location, wherein the first graphical program generates data at the location;
providing the data to the second graphical program;
executing the second graphical program, wherein the second graphical program uses the data;
the second graphical program generating results;
based on the results, performing one or more of: halting execution of the first graphical program; entering a single stepping mode in the first graphical program; and/or completing execution of the first graphical program.

30. A memory medium comprising program instructions for analyzing a first graphical program, wherein the program instructions are executable to implement:
storing the first graphical program in a memory of a computer system, wherein the first graphical program comprises a first plurality of interconnected graphical program nodes or icons that graphically represents functionality of the first graphical program, and wherein the first graphical program is executable by the computer system to perform the functionality, wherein the first graphical program was created using a graphical programming development environment;
associating a second graphical program at a location in the first graphical program, wherein said associating does not modify the functionality of the first graphical program, wherein the second graphical program comprises a second plurality of interconnected graphical program nodes or icons that graphically represents functionality of the second graphical program, wherein the second graphical program was created using the graphical programming development environment;
wherein the second graphical program is executable during execution of the first graphical program to aid in analyzing at least a portion of the first graphical program.

31. The memory medium of claim 30, wherein said associating does not require a re-compilation of the first graphical program.

32. The memory medium of claim 30, wherein the program instructions are further executable to implement:
executing the first graphical program up to the location;
executing the second graphical program after executing the first graphical program up to the location; and
the second graphical program generating results, wherein the results are useful in analyzing at least a portion of the first graphical program.

33. The memory medium of claim 30, wherein the program instructions are further executable to implement:
executing the first graphical program up to the location, wherein the first graphical program generates data at the location;
providing the data to the second graphical program;
executing the second graphical program, wherein the second graphical program uses the data;
the second graphical program generating results;
based on the results, performing one or more of: halting execution of the first graphical program; entering a single stepping mode in the first graphical program; and/or completing execution of the first graphical program.

34. A memory medium comprising:
a first graphical program, wherein the first graphical program comprises a first plurality of interconnected nodes which visually indicate functionality of the first graphical program, and wherein the first graphical program is executable by a computer system to perform the functionality, wherein the first graphical program was created using a graphical programming development environment;
a second graphical program, wherein the second graphical program comprises a second plurality of interconnected graphical program nodes or icons that graphically represents functionality of the second graphical program, wherein the second graphical program was created using the graphical programming development environment;
a data structure which is operable to store information associating the second graphical program with a location in the first graphical program, wherein the functionality of the first graphical program is not modified by the second graphical program;
wherein the second graphical program is executable during execution of the first graphical program to aid in analyzing at least a portion of the first graphical program.

35. The memory medium of claim 34, further comprising program instructions which are executable to:
execute the first graphical program up to the location, wherein the first graphical program generates data at the location;
provide the data to the second graphical program;
execute the second graphical program, wherein the second graphical program uses the data and generates results;
based on the results, perform one or more of: halting execution of the first graphical program; entering single stepping mode in the first graphical program; and/or completing execution of the first graphical program.

36. The computer-implemented method of claim 1, wherein said associating the debugging graphical program at the debugging location in the first graphical program comprises:
including the debugging graphical program at the debugging location in the first graphical program.

37. The computer-implemented method of claim 22, further comprising:
including the debugging graphical program at a debugging location in the first graphical, wherein said including does not modify the functionality of the first graphical program.

38. The computer-implemented method of claim 26, wherein said associating the second graphical program at the location in the first graphical program comprises:

including the second graphical program at the location in the first graphical program.

39. The memory medium of claim 30, wherein, in said associating the second graphical program at the location in the first graphical program comprises, the program instructions are further executable to implement:

including the second graphical program at the location in the first graphical program.

\* \* \* \* \*